United States Patent Office 3,424,274
Patented Jan. 28, 1969

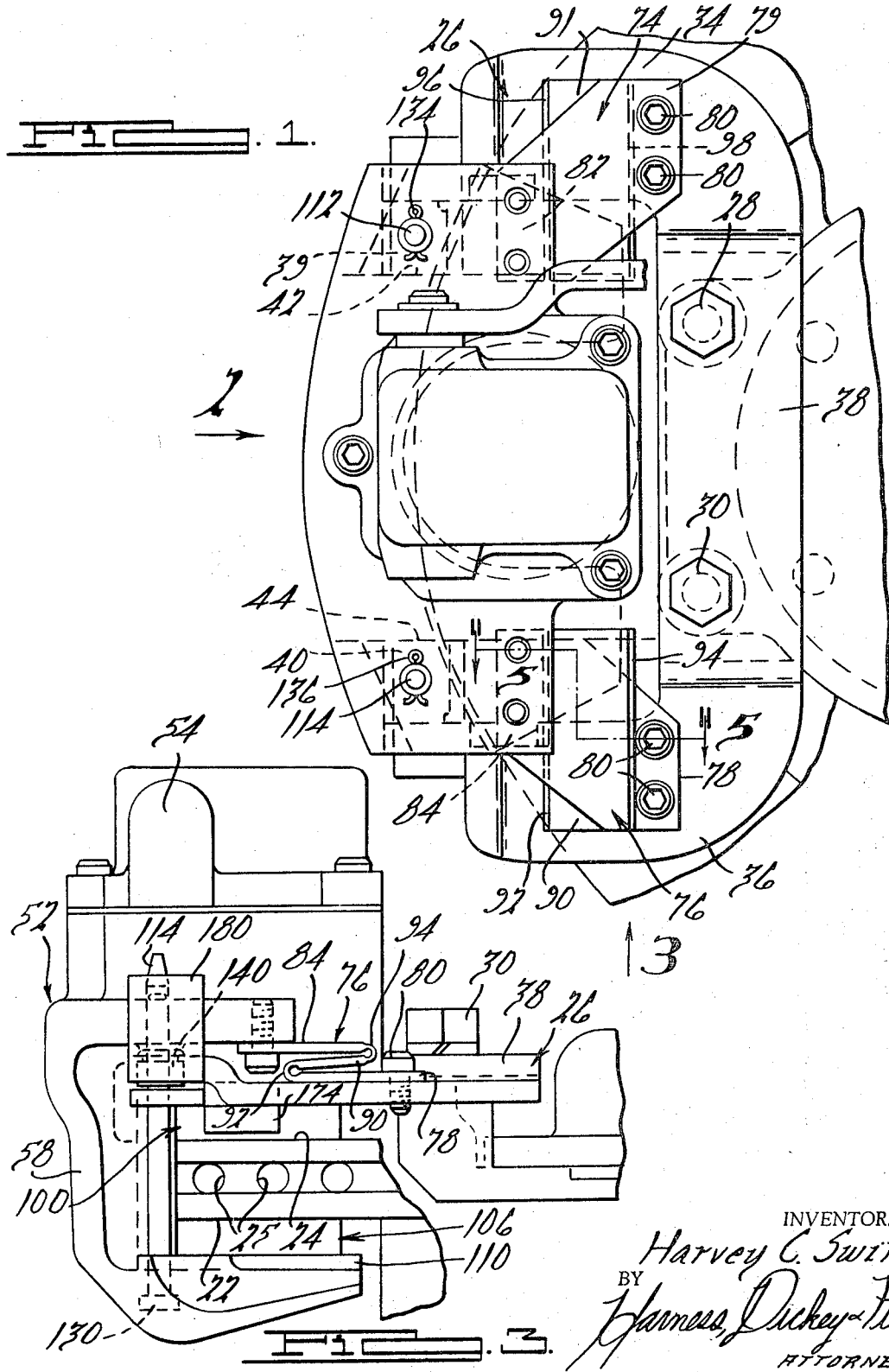

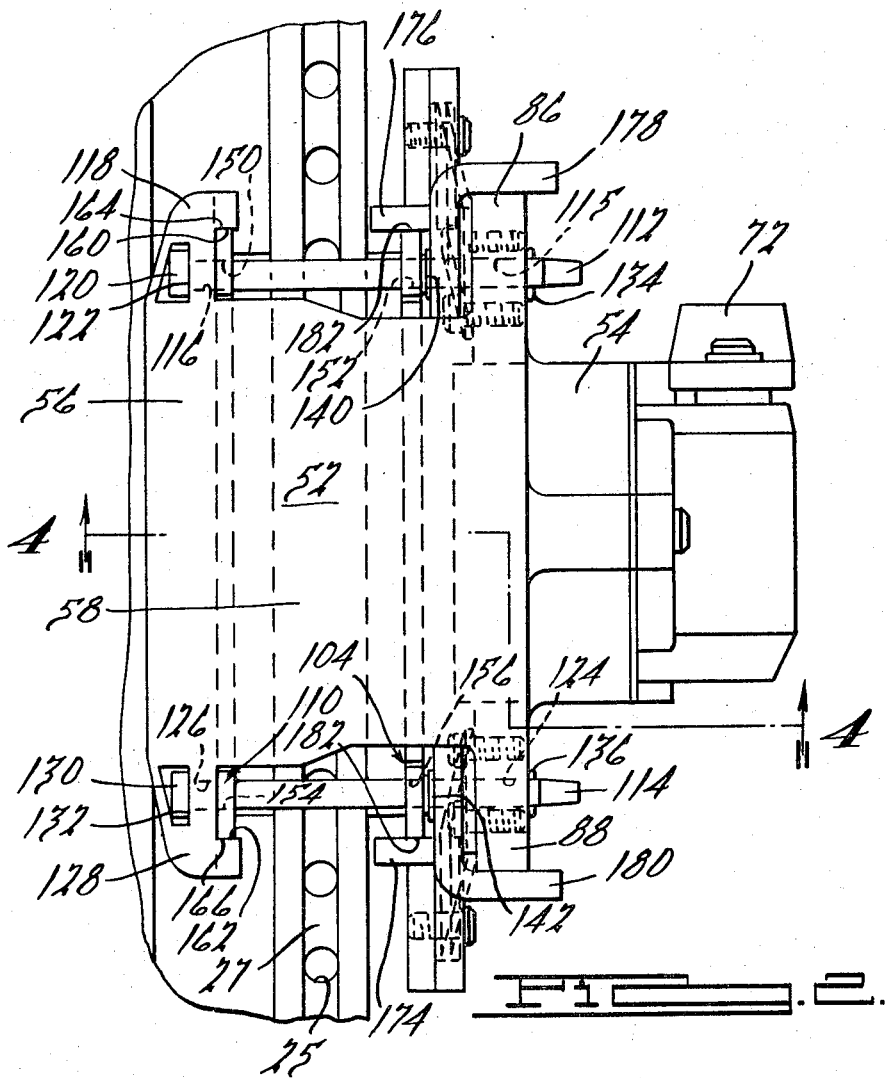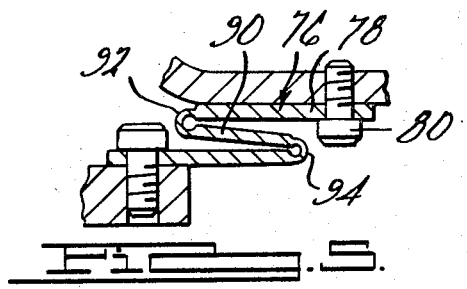

3,424,274
DISK BRAKE AND SUPPORT AND GUIDE
MEANS THEREFOR
Harvey C. Swift, Birmingham, Mich., assignor to Kelsey-Hayes Company, Romulus, Mich., a corporation of Delaware
Filed Mar. 15, 1967, Ser. No. 623,443
U.S. Cl. 188—73                               4 Claims
Int. Cl. F16d 55/224

ABSTRACT OF THE DISCLOSURE

This invention relates to a disk brake of the sliding caliper type in which a caliper having a fluid motor portion and a reaction portion is mounted on the stationary torque plate by yieldable means in the form of flex straps. A piston is mounted in the fluid motor portion of the caliper for moving a brake shoe having a brake lining thereon into engagement with a braking face of a rotary disk that is attached to a wheel to be braked.

BACKGROUND OF THE INVENTION

This invention pertains to a disk brake of the sliding caliper type.

PRIOR ART

In prior art disk brakes, a stationary torque plate is provided having a caliper mounted thereon for sliding movement relative thereto. A piston operated by fluid under pressure is positioned in one leg of the caliper to move one brake shoe into engagement with one side of a rotary disk to be braked, while the other leg of the caliper is provided with means for urging a brake shoe into engagement with the other side of a rotary disk, when the piston is operated by the fluid under pressure.

In these prior art devices, the torque plate is provided with shoulder means for absorbing the braking torque from the brake shoe operated by the fluid motor portion of the caliper. Pin means may be employed to support the caliper for sliding movement on the stationary torque plate with these pin means being employed to support the brake shoes. When the two brake shoes come into braking engagement with the opposite faces of the disk to be braked, a twisting couple is produced which will tend to rotate or twist the caliper in a plane generally perpendicular to the plane of rotation of the disk. A number of different mechanisms have been proposed to resist this twisting couple. Many of them are quite complicated, are expensive and add complexity to the brake structure.

In the present invention, a stationary torque plate is provided with means for not only absorbing the braking torque from a brake shoe but also to prevent or resist the twisting couple when the brake shoes come into engagement with a rotary disk to be braked as the brakes are applied. This means may take the form of a pair of spaced inwardly extending flanges that are engageable with one of the brake shoes operated by the fluid motor portion of the caliper and a second pair of spaced flanges extending in the other direction which will engage spaced means on the fluid motor portion of the caliper for resisting or preventing the twisting couple produced when the brake shoes come into engagement with the rotary disk with braking force. Thus, in the invention these means are easily formed on the stationary torque plate and they provide a compact and extremely efficient structure for accomplishing the above-mentioned purposes.

SUMMARY

The present invention provides a disk brake adapted to brake a rotatable disk and it includes a caliper having a fluid motor portion adapted to be positioned on one side of the disk and a reaction portion adapted to be positioned on the other side of the disk. A torque plate has a main body portion positioned in a plane generally parallel to the plane of rotation of the disk. A first brake shoe is positioned adjacent the fluid motor portion of the caliper and a second brake shoe is positioned adjacent the reaction portion of the caliper. Means are coupled to the caliper for supporting the brake shoes from it. A first pair of spaced axially extending flanges extends from the main body portion of the torque plate in a direction away from the rotatable disk and a second pair of spaced axially extending flanges extends in a direction toward the rotatable disk. Means are provided on the first brake shoe which are engageable with the first pair of axially extending flanges for transferring torque from the first brake shoe to the torque plate, and means are provided on the caliper engaging a second pair of axially extending flanges for resisting the twisting couple produced during braking action.

BRIEF DESCRIPTION OF THE DRAWING

FIGURE 1 is a side elevational view of the disk brake of the present invention;

FIG. 2 is an end elevation taken in the direction of the arrow of FIG. 1;

FIG. 3 is a bottom elevational view taken in a direction of the arrow 3 of FIG. 1;

FIG. 5 is a sectional view taken along the lines 5—5 of FIG. 1.

Figure 4:
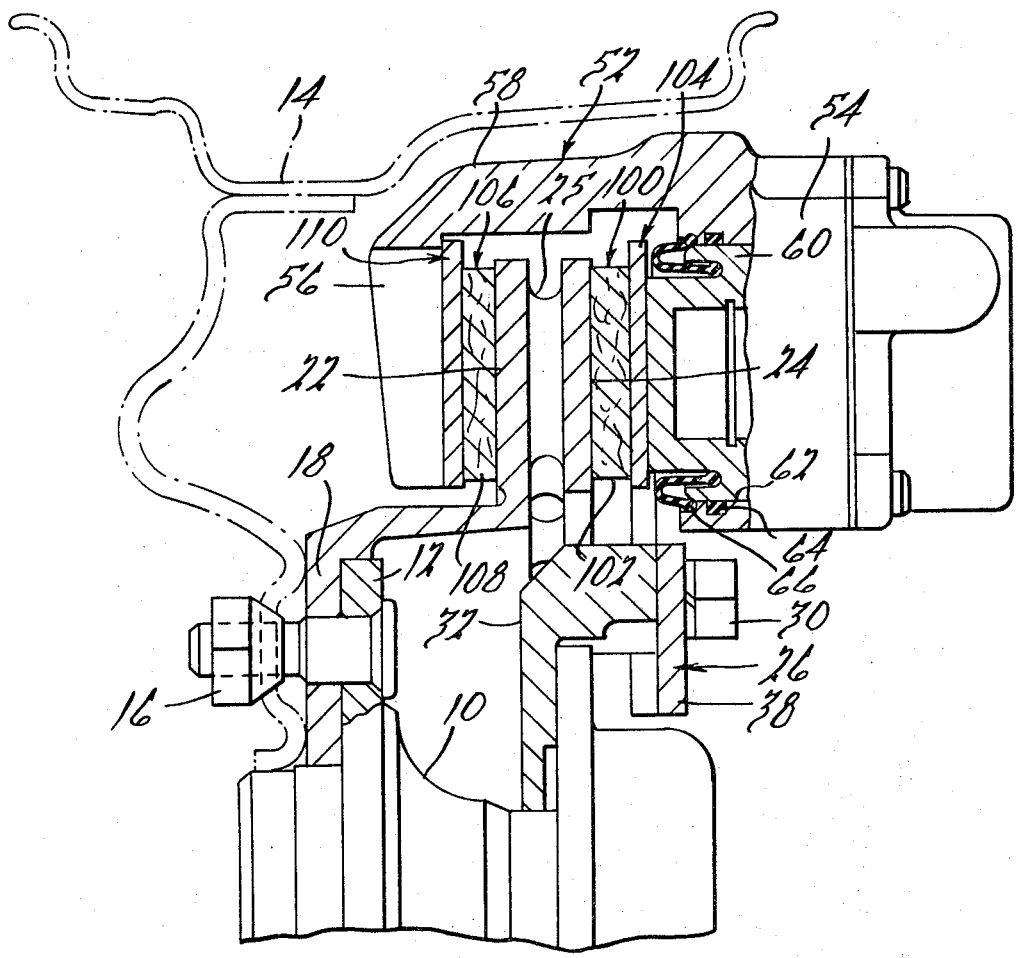
FIG. 4 is a sectional view taken along the lines 4—4 of FIG. 2.

Referring now to the drawings in which like reference numerals designate like parts throughout the several views thereof, there is shown in FIG. 4 a rotatable hub 10 having an attaching flange 12 formed integrally therewith. A wheel 14 is attached to the attaching flange 12 by means of a nut and bolt assembly, one of which is shown at 16. The attaching means 16 also attaches an attaching flange 18 of a rotatable disk 20 to the attaching flange 12. The rotatable disk 20 has a first braking surface 22, a second braking surface 24, and radially extending bores 25 connected by webs 27 to provide the conventional ventilation and cooling of the disk as it is rotated.

A generally C-shaped stationary torque plate 26 is attached by means of bolts 28 and 30 to a stationary member 32 that forms a portion of the steering knuckle or other stationary part of the vehicle. As can best be seen by reference to FIGS. 1, 2 and 3, this stationary torque plate has an upper arm 34 and a lower arm 36 which are integrally formed with a main body portion 38 that provides the means for the attachment of the stationary torque plate 26 to the stationary member 32 by means of the bolts 28 and 30. These arms 34 and 36 are spaced axially inwardly of the main body portion 38. The arms 34 and 36 have reduced portions 39 and 40, respectively, having inwardly spaced shoulders 42 and 44 formed thereon which are positioned to be engageable with outwardly facing shoulders 46 and 48 on a caliper or housing 52. The reduced portions 38 and 40 are positioned in the same plane as the main body portion 38.

The caliper 52 includes a fluid motor portion 54, a reaction portion 56 and an interconnecting portion 58 that interconnects the fluid motor portion 54 with the reaction portion 56. A conventional piston 60 is mounted in a bore 62 in the fluid motor portion 54 of the caliper 52 for reciprocation therein when hydraulic fluid under pressure is applied to the rear of the piston. A conventional O-ring seal 64 of generally rectangular cross section provides a seal between the outer wall of the piston 60 and the cylinder wall 62, while a conventional boot 66 is attached at one end to the caliper 52 and at the other end to the piston 60.

The piston 60 is also adapted to be actuated by a lever 72, shown in FIG. 2, that is employed and forms a part of a hand brake actuating mechanism. This hand brake actuating mechanism contained within the fluid motor portion 54 of the caliper 52 is conventional in nature and therefore a detailed description thereof is considered to be unnecessary.

The stationary torque plate 26 is coupled to the caliper 52 by means of a pair of flexible straps 74 and 76 which are shown in elevation in FIG. 1. The flexible strap 74 comprises a first planar portion 78 attached to the arm 36 of the torque plate via bolts 80, while the flexible strap 76 also has a first planar portion 79 connected to the arm 34. Second planar portions 82 and 84 of the flexible straps 74 and 76, respectively, are attached to the inner surfaces of outwardly extending flanges 86 and 88 positioned on the fluid motor portion 54 of the caliper 52. The flex straps 74 and 76, as can best be seen by reference to FIGS. 3 and 5, comprise intermediate portions 91 and 90, respectively, interconnecting the planar portions 78 and 84 of the flex strap 76, and 79, 82 of the flex strap 74. Hinges 92 and 94 interconnect these two planar portions of the flex strap 76 with the intermediate portion 91 while similar hinges 96 and 98 interconnect the planar portions 79 and 82 of the flex straps 74.

As best seen by reference to FIG. 1, the axes of the hinges of each of the flex straps 74 and 76 are located in spaced vertical lines and they thereby permit the movement of the caliper 52 with respect to the torque plate 26 in a direction generally perpendicular to the plane of rotation of the disk 20.

A first brake shoe 100 having a brake lining 102 suitably affixed to a backing plate 104 is positioned so that the brake lining 102 engages the face 24 of the rotatable disk 20 when the pitson 60 is actuated and moves the backing plate 104 and the lining 102 to the left, as shown in FIG. 4. Similarly, a brake shoe 106 having a brake lining 108 and a backing plate 110 is positioned adjacent the reaction portion 56 of the caliper 52 so that during braking operations, when the reaction portion 56 is moved to the right, as shown in FIG. 4, it will force the brake lining 108 into engagement with the face 22 of the rotatable disk 20 with braking force.

The brake shoes 100 and 106 are supported on the caliper 52 by means of a pair of spaced pins 112 and 114. The pin 112 extends through an aperture 115 positioned in the flange 86 in the fluid motor portion 54 of the caliper 52. It also extends through an aperture 116 that is axially aligned with the aperture 115 positioned in an outwardly extending flange 118 positioned on the reaction portion 56 of the caliper 52. The pin 112 has a head 120 positioned in engagement with a shoulder 122 of the flange 118.

Similarly, the pin 114 extends through an aperture 124 positioned in the flange 88 of the fluid motor portion 54 of the caliper 52. This pin also extends through an axially aligned aperture or bore 126 formed in another outwardly extending flange 128 formed on the reaction portion 56 of the caliper 52. This pin also has a head 130 positioned in engagement with a shoulder 132 formed on the flange 128.

The pins 112 and 114 are secured to the caliper 52 by means of the heads 120 and 130, respectively, and by means of cotter keys or pins 134 and 136, respectively. The pins 112 and 114 are also resiliently mounted in the reduced portions 39 and 40 of the arms 34 and 36, respectively, of the torque plate by means of grommets 140 and 142 which are constructed of an elastomeric material.

The pins 112 and 114 support the brake shoes 101 and 106 by passing through apertures in the backing plates 110 and 104. The pin 112 passes through an aperture 150 in the backing plate 110 and through an aperture 152 in the backing plate 104. Similarly, the pin 114 passes through an aperture 154 in the backing plate 110 and through an aperture 156 in the backing plate 104.

The outwardly extending flanges 118 and 128 positioned on the reaction portion 56 of the caliper 52 have inwardly extending spaced shoulders 160 and 162 that are engageable with outwardly extending edges 164 and 166 positioned on the backing plate 110 of the brake shoe 106 for absorbing the braking torque of the brake shoe 106 when the lining 108 is forced into engagement with the face 22 of the rotatable disk 20 during brake operations.

The arms 34 and 36 of the stationary torque plate 26 have integrally formed, axially inwardly extending flanges 174 and 176 formed thereon that are engageable with outwardly extending surfaces 180 and 182 positioned on the backing plate 104 of the brake shoe 100 during braking operations for transferring the braking torque from the brake shoe 100 in the backing plate 104 to the stationary torque plate 26, when the brake lining 102 is moved into engagement with the face 24 of the rotor 20 by the piston 60.

Additionally, the torque plate 26 has integrally formed, axially rearwardly extending flanges 178 and 180 that are engageable by the edges of the outwardly extending flanges 86 and 88 on the fluid motor portion of the caliper to resist and restrain the twisting couple produced when the brake shoes 100 and 106 are engaged with the braking faces of the motor during braking operations.

The present invention thereby provides a very compact and efficient structure for not only taking the torque from the brake shoes but for resisting the twisting couple produced during braking action.

As previously described, the two flex straps 74 and 76 are positioned adjacent the first brake shoe and more closely adjacent the position where the torque is transferred to the torque plate via the backing plate on the brake shoe motivated by the fluid piston 60. This location of the flex straps provides the advantage that it minimizes the twisting couple on the flex straps that is produced by the engagement of the brake shoes with the braking faces positioned on the rotatable disk 20. Furthermore, it reduces noise and vibration in the disk brake which often causes problems, particularly with respect to customer acceptance of this type of braking mechanism. It can be appreciated also that the flex straps of the invention are of minimum size and are positioned so that they couple closely spaced surfaces on the caliper and torque plate thereby minimizing the amount of material needed for such a flexible strap. The fact that the two planar end portions of the flexible straps are positioned in planes that are closely spaced with respect to each other in an axial direction, also minimizes the twisting of the flex straps that is produced by the twisting couple occurring during braking action.

What is claimed is:

1. A disk brake adapted to brake a rotatable disk comprising a caliper having a fluid motor portion adapted to be positioned on one side of the disk and a reaction portion adapted to be positioned on the other side of the disk, a relatively thin torque plate adapted to be fixed against rotation relative to the disk and having a main body portion extending in a plane generally parallel to the plane of the rotation of the disk and juxtaposed to said fluid motor portion, said main body portion having a first face facing one side of said disk and an oppositely facing second face, a first brake shoe juxtaposed to said fluid motor portion and adapted to be positioned on the one side of the disk, a second brake shoe juxtaposed to said reaction portion and adapted to be positioned on the other side of the disk, means for supporting said caliper for sliding movement relative to said torque plate in a direction substantially perpendicular to the plane of rotation of the disk, fluid motor means carried by said fluid motor portion of said caliper for urging said first brake shoe into frictional engagement with the one side of the disk and for sliding said caliper relative to the disk for urging said second brake shoe into engagement with the other side of the disk by said reaction portion, means for transmitting braking torque from said second brake shoe to said reaction portion of said caliper for generating a torque couple upon said caliper tending to rotate said caliper in a plane perpendicular to the plane of rotation of the disk, a first pair of spaced axially extending flanges formed integrally from said torque plate extending from said first face of said main body portion toward said disk, means on said first brake shoe engaging said first pair of flanges for transferring braking torque from said first brake shoe to said torque plate through said first pair of flanges, a second pair of spaced axially extending flanges formed integrally from said torque plate and extending from said second face of said main body portion in a direction away from the disk, and abutment means formed on said caliper and engaging said second pair of flanges over an area having substantially greater width in a direction parallel to the axis of rotation of the disk than the thickness of said torque plate for resisting the twisting couple on said caliper.

2. The combination of claim 1 in which said means on said caliper comprises a first outwardly extending flange on said caliper and a second outwardly extending flange on said caliper.

3. The combination of claim 1 in which a first flexible strap couples said caliper and said torque plate and a second flexible strap couples said caliper and said torque plate.

4. The combination of claim 3 in which a pair of pins extends from said torque plate in an axial direction and over the periphery of the disk and comprises means for supporting the brake shoes relative to the caliper.

References Cited

UNITED STATES PATENTS

| 3,182,754 | 5/1965 | Hahn et al. | 188—73 |
| 3,265,160 | 8/1966 | Elberg et al. | 188—73 |
| 3,310,135 | 3/1967 | Wells | 188—73 |
| 3,346,076 | 10/1967 | Hayes | 188—73 |

FOREIGN PATENTS

| 717,350 | 10/1954 | Great Britain. |
| 1,387,368 | 12/1964 | France. |

GEORGE E. A. HALVOSA, *Primary Examiner.*